Patented Feb. 4, 1930

1,745,723

UNITED STATES PATENT OFFICE

WALTER O. SNELLING, OF ALLENTOWN, PENNSYLVANIA

CURRENT-RECTIFYING DEVICE

No Drawing.   Application filed February 24, 1923. Serial No. 621,112.

My invention relates to current rectifying devices of the general nature of natural crystal detectors, and more particularly relates to improvements in contact rectifiers, electric valves, contact detectors and like devices having the property of detecting electromagnetic waves, and of modifying the currents set up by ether waves or other radiant energy.

It has long been known that the electrical conductivity of certain natural minerals varies with the direction in which the electrical current passes through the mineral, and with the intensity and duration of the applied electro-motive force. This property has been referred to as "uni-directional" conductivity, but may be more properly called selective conductivity or valve action, since in many cases the selective action made use of in the detection of radiant energy is not the directional factor at all, but is rather the variation in response of the contact element to changes in the duration or the intensity of the applied electrical pressure.

The fact that many natural minerals show selective electrical conductivity has caused efforts to be made to prepare synthetic products having the same effect. On preparing the corresponding sulfides, selenides, tellurides and arsenides of metals known to possess current rectifying properties as the naturally occurring crystals, by fusing together the metal and the non-metallic component, products have been obtained which possess fair rectifying properties. It is known, for example, that by melting together a mixture of lead and sulfur to form lead sulfide, the fusion mass obtained possesses current rectifying properties which are approximately equal to the current rectifying properties of natural galena.

Efforts to make other synthetic current rectifying products have not been equally successful however, and in general it has been found that the products obtained by fusing together the components of natural minerals in the proportions in which the components exist in the natural minerals, do not yield products having satisfactory current rectifying characteristics, although such products frequently show slight current rectifying ability.

On examining a large number of synthetic products made by fusing together the components in the proportions in which the components of the natural minerals are present, I have found that although such products frequently possess slight current rectifying charactertistics, the rectification is in general too poor to enable the products so made to be of commercial use.

In the course of my examination of synthetic fusion mixtures, corresponding in composition to natural minerals, I observed that these synthetic mixtures usually possessed either very low electrical conductivity, or else very high electrical conductivity. Fused sulfide of copper and sulfide of iron for example are good conductors of electricity, but have poor current rectifying characteristics; while sulfide of zinc and sulfide of molybdenum are relatively poor conductors of electricity, and are also without good current rectifying characteristics.

My investigation disclosed the fact that good electrical conductivity is unfavorable to current rectifying characteristics, and that poor electrical conductivity is also unfavorable to current rectifying characteristics. Where a material is a good conductor of electricity, there appears to be so many migratory electrons present in the structural lattice that the material is incapable of opposing the flow of electricity in either direction, and accordingly cannot show uni-directional conductivity. On the other hand, where a material is a very poor conductor of electricity it may possess a strong tendency toward uni-directional conductivity, but its high electrical resistance only permits a very small amount of current to pass through the material, and accordingly although the product may show rectifying characteristics, it does not permit sufficient current to flow to give loud signals when used as a detector, and when used as a rectifier is unable to pass more than extremely minute currents.

On considering the above facts it occurred to me that by properly combining a material which has excellent electrical conductivity but poor rectifying characteristics with another material having good rectifying characteristics but poor electrical conductivity, it might be possible to combine the good points of the two materials, the material of good electrical conductivity serving to supply the necessary number of loosely held or migratory electrons and the material of good rectifying characteristics serving to control the uni-directional action or valve effect of the migratory electrons with the result of giving a product which would possess marked uni-directional characteristics and good electrical conductivity.

Experiments have proven this to be a simple and effective method of making current rectifying elements, products made in accordance with my present invention possessing unique and remarkable current rectifying characteristics. In addition to their usefulness as detectors and amplifiers in radio circuits of the usual type, my new products possess such marked rectifying action that they may be used for the rectification of alternating currents, for the purpose of charging storage batteries or for other purposes where a supply of direct current is desired, and for many other purposes where the rectification of alternating or oscillating currents is desirable.

As a general example of my present invention, I will describe a procedure which I may employ in preparing a current rectifying element having very pronounced uni-lateral conductivity. I take a material which possesses uni-directional characteristics, but which is a relatively poor conductor of electricity, and a second material which is miscible in fused condition with the first body, and which is a better conductor of electricity than the first body. I now consolidate these two materials as by fusing them together for example, and I find that the resulting product has much more desirable characteristics as a rectifying element than either of the component bodies. Fused copper sulfide for example is an excellent conductor of electricity, but has very feeble current rectifying characteristics, while fused lead sulfide has inherent current rectifying characteristics, but does not possess sufficiently good electrical conductivity to pass the amount of current necessary for battery charging and like purposes. By fusing together suitable amounts of lead sulfide and copper sulfide, however, I obtain a product which when properly connected in a circuit, as by electrodes of different surface area, shows both good current rectifying characteristics and good electrical conductivity. Since the electrical conductivity of an element made as described is of course largely uni-directional, I find it of advantage when using my new elements for rectifying alternating currents for charging batteries and like purposes, to use a plurality of elements, so connected that a path is at all times open to the current through each rectifying element in the direction of its lowest resistance, using the well known arrangement that has previously been used for the same purpose with lead-aluminum chemical rectifiers.

There are a large number of methods which may be employed in preparing detecting and rectifying elements in accordance with my present invention. I may, for example bring together in solution suitable amounts of the two metal elements desired in my final product, and then simultaneously precipitate the two metals by means of a suitable reagent. The resulting precipitate contains compounds of the two metal elements in admixed condition, and in form suitable to subsequent drying, compressing and sintering operations. I find that this method of procedure is well adapted to the simultaneous precipitation of one or more of the binary compounds of metals such as silver, mercury, lead, copper, bismuth, nickle, cobalt, molybdenum, zinc, iron and many other metallic elements. In practicing this form of my invention I prefer to use hydrogen sulfide as my precipitant, and I employ one or more metals which give sulfides of high electrical conductivity, in combination with one or more metals which give sulfides of good current rectifying characteristics. For example, copper and iron represent typical metals whose sulfides have good electrical conductivity, and lead and molybdenum represent typical metals whose sulfides have inherent rectifying characteristics. The choice of the particular metal elements used, and of the non-metallic element which is employed to combine with the metal elements, will of course depend upon the electrical conductivity and the rectifying characteristics desired in the final products, an increased percentage of the metal element having good electrical conductivity increasing the electrical conductivity of the resulting product, and an increased percentage of the metal element having high inherent rectifying characteristics increasing the rectifying ability of the resulting product.

At this point attention should be called to the fact that a similar control to that above described as brought about by the choice of suitable metal elements, can also be brought about by the choice of suitable non-metallic components. Many selenides, tellurides and arsenides are better electrical conductors than the corresponding metal sulfides, and accordingly by preparing an admixture of a sulfide of a metal having inherent rectifying characteristics and a selenide, telluride or arsenide of the same or another metal, possessing increased current conducting characteristics, a resulting product possessing modified characteristics of electrical conductivity and current rectifying ability may be obtained.

Instead of admixing soluble salts of two or more metals and simultaneously precipitating by means of an element of the sulfur group or a compound of same, I may separately prepare the compounds of two or more metals having suitable characteristics, and subsequently mix these together, or I may mix together the oxides or other compounds of two or more metals and may then reduce this mixture by means of a molten element of the sulfur group or molten mixture of elements of the sulfur group, or by contacting the mixture of oxides or other compounds with a vaporous element of the sulfur group, or with a vaporous or gaseous compound of an element of the sulfur group under conditions favoring the decomposition of such compound.

As a specific example of my invention, I will describe a procedure which I may employ for the production of current rectifying bodies particularly desirable for use in the rectification of alternating currents of low frequency, for the purpose of obtaining direct currents therefrom. For this purpose I may admix 60% by weight of precipitated lead sulfide and 40% by weight of finely divided copper sulfide, these two components being first thoroughly incorporated, and then compressed in a hand or hydraulic press until a tough coherent mass is obtained. The block or pellet so prepared is next heated to redness for a few minutes in an atmosphere of sulfur vapor. The product obtained in this manner is not sensitive to alternating currents of high frequency, and is practically without value as a detector of radio signals when used in the customary type of simple radio receiving outfit. Notwithstanding the fact that the product appears to be without rectifying characteristics in connection with very rapid oscillatory changes of voltage, the contact element made as described forms a most efficient and satisfactory rectifier for alternating currents of low frequency, and is superior for such rectification to any product hitherto known as a contact rectifier.

Increasing the percentage of lead sulfide in the example just given leads to the production of products increasingly sensitive to high frequency currents, and having increased electrical resistance and decreased electrical conductivity.

As a specific example of a method which I may employ for the preparation of a quite different type of product, I will describe a method by which I obtain a contact rectifying element which is extremely sensitive to very rapid oscillatory changes of voltage, and which may be employed as a contact detector for use in radio receiving sets. For this purpose I may admix 99.7 parts by weight of litharge, and three tenths parts by weight of very finely divided copper oxide. I next thoroughly incorporate the two components, and I then compress the resulting mixture by means of a suitable hand or mechanical press, to obtain a block or tablet possessing suitable coherence. I next heat the compressed tablet or block for one or two minutes in an atmosphere of sulfur vapor at a red heat. The product obtained in the manner described is extraordinarily sensitive to very rapid oscillations, and forms an excellent contact detector or rectifier for radio work.

I find that although the addition of relatively large percentages of materials of low electrical conductivity are generally required to bring about any substantial modification of the characteristics of compounds of high electrical conductivity, very small amounts of some compounds of high electrical conductivity have a striking effect on the current rectifying characteristics of compounds of high electrical resistance. The addition of as little as one tenth of one percent of a suitable compound of high electrical conductivity to a compound of lower electrical conductivity is often sufficient to bring about desirable changes in the electrical conductivity of the product, and when using compounds which themselves possess strong current modifying characteristics, I find that very small percentages, or fractional percentages, are sufficient to desirably modify the characteristics of the primary product. I find for example that fractional percentages of iron sulfide, copper sulfide, lead selenide, and like compounds of very high electrical conductivity are capable of materially modifying the current rectifying and current conducting characteristics of lead sulfide, molybdenum sulfide, silver sulfide, and like compounds of lower electrical conductivity, and the presence of large amounts of such active materials has the effect of lowering the range of sensitiveness of the current rectifying elements to relatively low frequency, and making them less sensitive to electrical oscillations of high frequency. By application of this principle I am able to modify the sensitivity range of such materials as lead sulfide, silver sulfide, molybdenum sulfide and like compounds to a desirable extent.

It will of course be evident that instead of admixing my components in the manner which has been described, I may prepare a block containing one component, and I may impregnate this block with a suitable solution of another component, and I may in general employ many modifications in the bringing together of the components which I employ, to obtain the controllable variation of the electrical conductivity and the current rectifying characteristics of my final products.

In one form of my invention I prepare a block or pellet of a substance having a relatively large number of loosely held, migratory or free electrons, and I then provide a surface for this block which consists of a material chemically related to the material forming the main portion of the block, but composed of a material containing a smaller number of loosely held electrons than the material forming the body of the block. I may, for example form the body of my pellet of a metallic sulfide having relatively high electrical conductivity, and the surface of my pellet of a metallic sulfide having lower electrical conductivity, in this case the ion in common being the sulfur ion, or I may form the body of my pellet of a metal selenide, and the surface of the pellet of a metal sulfide, and by employing the same metal both as the sulfide and the selenide, the ion in common is the metal ion. In making such composite or surfaced pellets, it is often convenient to first introduce the oxide of one metal into a mold, and then introduce into the mold a suitable amount of the oxide of another metal, choosing in the example given two metals whose sulfides show a difference in electrical conductivity. By now compressing the material in the mold to a suitable density a composite pellet will be obtained, the lower part of the pellet being the oxide of one metal and the upper part of the pellet being the oxide of another metal. By heating the composite pellet so prepared in an atmosphere of sulfur vapor, or in an atmosphere of hydrogen sulfide or other suitable agent capable of effecting the reduction of the oxide with the formation of compounds, I obtain as my final product in the example given a pellet having a body of a metal sulfide of high electrical conductivity and one surface composed of a metal sulfide of lower conductivity; and I find that such composite pellets possess advantages with respect to electrical conductivity over pellets composed wholly of a single metal sulfide. It will of course be evident that the general process outlined is capable of many variations, while still applying the fundamental principle of preparing a contact rectifying product having a body of a material of relatively high electrical conductivity and a surface of a material of relatively lower electrical conductivity, the two substances being chemically related, and forming a solid solution at their surface of contact. In general, I prefer to employ in this phase of my invention two materials which are compounds of a single element. This element may be either the metal component, or the non-metal component.

I have discovered that a very large number of the compounds of metals with elements of the sulfur group possess inherent current rectifying characteristics, but such current rectifying ability has in most cases been hidden from previous observers, through the fact that such compounds usually either possess very high electrical resistance, or very low electrical resistance, and in either case the inherent current rectifying characteristics do not show themselves, so that to date it has only been those few natural materials which possess an intermediate electrical conductivity that have been recognized as possessing current rectifying ability. I have discovered that a very large number of compounds of metals with elements of the sulfur group which had not previously been known to have current rectifying characteristics, can be used as rectifying elements by suitably combining them with a material possessing better electrical conductivity than their own, in the case of materials of low electrical conductivity, or with a material possessing poorer electrical conductivity than their own, in the case of materials of good electrical conductivity.

It is my belief that a current rectifying material must possess loosely bound or migratory electrons, but must not possess an excessive number of such loosely bound or migratory electrons. By uniting any suitable material having too large a number of migratory ions with another material whose ions are more tightly held, and being careful to choose two materials of sufficient chemical similarity so that they are mutually miscible in fused condition or mutually soluble to form solid solutions when cooled, or sufficiently alike so that a common ionic or electron lattice structure may be formed, I find that I can obtain current rectifying products from a very large number of materials.

It should be noted that my invention is not confined to metallic sulfides as my active agents, and although metallic sulfides form in general the most convenient and effective materials in the practice of my invention, I have found that other compounds which are miscible in fused condition or which form solid solutions, and which possess a difference in the number of loosely held or migratory electrons, may be used in the practice of my invention, the essential principle being that at the rectifying surface or area there should be available a sufficient number of free or loosely bound electrons to enable the necessary amount of current to be conducted by the current rectifying element, but a sufficient number of electrons should not be present to give metallic conductivity, as this will prevent uni-lateral or rectifying action.

The choice of metal components and non-metal components is determined by the characteristics desired in the finished rectifying product. Although I prefer to employ silver, mercury, lead, molybdenum, bismuth, nickel, iron, antimony, arsenic and zinc as my metal components, and sulfur selenium, tellurium and arsenic as my non-metallic components, my invention is by no means limited to the use of those specific materials, and I have obtained excellent products by the use of other materials than those named, by the use of my general principle of controlling the electrical conductivity and the current rectifying characteristics of contact rectifying elements by modifying the number of free, loosely bound or migratory ions, by combining together one material having an excessive number of migratory ions with a chemically or physically related material having a much smaller number of loosely bound or migratory ions. It will be noted that arsenic has been referred to as both a metal and a non-metal. This is not by inadvertence, since I have found that arsenic may be employed both as a metal and as a non-metal component. Combined with copper or nickel for example, arsenic behaves as a non-metal, and gives compounds having high electrical conductivity, but combined with sulfur, arsenic gives compounds which have low electrical conductivity, corresponding to the presence of relatively few loosely bound or free electrons.

Although many of the products made in accordance with my present invention are fused mixtures of metal and non-metal components, it is not necessary that my products should be fused, and I find for example that by acting on a mixture of metal oxides with a vaporous element of the sulfur group or with decomposable compounds of same at a temperature below the fusing point of the final compound formed, I obtain products which for certain purposes possess advantages over the corresponding fused product. In general I may employ in the practice of my present invention the various principles of controlling electrical conductivity and other characteristics of rectifying elements described in my pending applications S. N. 615,160, S. N. 617,173, Patent No. 1,638,278 and Patent No. 1,686,183.

The distinguishing feature of my present invention is the control of the electrical conductivity and the current rectifying characteristics of contact rectifying elements, by combining as a homogeneous product two or more compounds, possessing different characteristics with respect to electrical conductivity so as to obtain as a final product a current rectifying element having desired electrical conductivity and current rectifying ability.

It will be evident that many changes may be made without departing from the spirit of my invention as herein disclosed. Although I have described certain specific embodiments of my invention, my invention is not to be considered as being limited to such specific embodiments, and no limitations are to be imposed, except such as are indicated in the appended claim.

I claim:

A contact rectifying element comprising a homogeneous mixture of copper sulfide and lead sulfide.

In testimony whereof, I have hereunto subscribed my name this 23rd day of February, 1923.

WALTER O. SNELLING.